United States Patent
Fujiwara et al.

(10) Patent No.: US 12,276,602 B2
(45) Date of Patent: Apr. 15, 2025

(54) INFRARED RAMAN MICROSCOPE AND DATA PROCESSING METHOD

(71) Applicant: SHIMADZU CORPORATION, Kyoto (JP)

(72) Inventors: Naoya Fujiwara, Kyoto (JP); Yusuke Aoi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 194 days.

(21) Appl. No.: 18/075,379

(22) Filed: Dec. 5, 2022

(65) Prior Publication Data
US 2023/0251187 A1 Aug. 10, 2023

(30) Foreign Application Priority Data
Feb. 4, 2022 (JP) ................ 2022-016565

(51) Int. Cl.
*G01N 21/35* (2014.01)
*G01N 21/65* (2006.01)

(52) U.S. Cl.
CPC ............ *G01N 21/35* (2013.01); *G01N 21/65* (2013.01); *G01N 2021/3595* (2013.01)

(58) Field of Classification Search
CPC . G01N 2021/3595; G01N 21/35; G01N 21/65
See application file for complete search history.

(56) References Cited

U.S. PATENT DOCUMENTS 6,067,154 A * 5/2000 Hossain ............... G01N 21/65
356/237.2
10,760,969 B1 * 9/2020 Wang ................... G01N 21/65

FOREIGN PATENT DOCUMENTS

JP 2001013095 1/2001

OTHER PUBLICATIONS

Fran Adar et al., "LabRam-IR—An Affordable Combination System ," Horiba Technical Reports, Sep. 2002, pp. 46-49.

* cited by examiner

*Primary Examiner* — Hina F Ayub
(74) *Attorney, Agent, or Firm* — JCIPRNET (57) ABSTRACT

An infrared spectrum display processing unit performs processing of displaying an infrared spectrum obtained by infrared spectroscopic analysis in a graph representing a relationship between a wave number and intensity. A data conversion processing unit performs processing of converting a Raman spectrum obtained by Raman spectroscopic analysis into an equal interval Raman spectrum in which data points are plotted by wave numbers at equal intervals. A Raman spectrum display processing unit performs processing of displaying an equal interval Raman spectrum as a graph representing a relationship between a wave number and intensity.

4 Claims, 10 Drawing Sheets

INFRARED RAMAN MICROSCOPE AND DATA PROCESSING METHOD

CROSS REFERENCE TO RELATED APPLICATIONS

This application claims priority to Japanese Patent Application No. 2022-16565 filed on Feb. 4, 2022, the entire disclosure of which is incorporated by reference herein.

BACKGROUND OF THE INVENTION

Field of the Invention

The present invention relates to an infrared Raman microscope capable of switching to and performing infrared spectroscopic analysis or Raman spectroscopic analysis for a sample on a stage, and a data processing method.

Description of the Related Art

As analysis methods for performing analysis by irradiating a sample with light, infrared spectroscopic analysis and Raman spectroscopic analysis are known (see, for example, JP-A-2001-13095). In the infrared spectroscopic analysis, an infrared spectrum is obtained by irradiating a measurement position of a sample with infrared light and measuring light absorption at each wavelength (wave number). On the other hand, in the Raman spectroscopic analysis, a Raman spectrum is obtained by irradiating a measurement position of a sample with light of a specific wavelength and measuring scattered light (Raman scattered light) generated from the sample.

Both the infrared spectrum and the Raman spectrum are vibration spectra based on molecular vibration. The molecular vibration includes a vibration mode appearing as a peak on a spectrum and a vibration mode not appearing as a peak, and appearance of a peak is different between the infrared spectroscopic analysis by absorption and the Raman spectroscopic analysis by scattering. For this reason, if analysis is performed using both the infrared spectrum and the Raman spectrum, more types of substances can be identified.

SUMMARY OF THE INVENTION

In the infrared spectroscopic analysis, reflected light from a sample irradiated with infrared light is received by an infrared spectrometer, and Fourier transform is performed for received light intensity of each wavelength, so that an infrared spectrum is obtained. This infrared spectrum is displayed as a graph that is represented by a wave number on the horizontal axis and intensity on the vertical axis on the basis of data plotted at equal intervals in the horizontal axis direction.

On the other hand, in a Raman spectrum obtained by the Raman spectroscopic analysis, the horizontal axis represents a Raman shift, and the vertical axis represents intensity. Since the Raman shift is a wave number difference between incident light and scattered light, data intervals plotted in the horizontal axis direction are not equal as in the infrared spectrum.

Some software used for the infrared spectroscopic analysis performs processing on the assumption that a spectrum (infrared spectrum) is data plotted at equal intervals in the horizontal axis direction. Such software cannot process a Raman spectrum with a Raman shift as the horizontal axis, and thus cannot be used for the Raman spectroscopic analysis.

The present invention has been made in view of the above circumstances, and an object of the present invention is to provide an infrared Raman microscope and a data processing method capable of using the same software when switching to and performing the infrared spectroscopic analysis or the Raman spectroscopic analysis.

A first aspect of the present invention is an infrared Raman microscope capable of switching to and performing infrared spectroscopic analysis or Raman spectroscopic analysis on a sample on a stage, the infrared Raman microscope including an infrared spectrum display processing unit, a data conversion processing unit, and a Raman spectrum display processing unit. The infrared spectrum display processing unit performs processing of displaying an infrared spectrum obtained by infrared spectroscopic analysis in a graph representing a relationship between a wave number and intensity. The data conversion processing unit performs processing of converting a Raman spectrum obtained by Raman spectroscopic analysis into an equal interval Raman spectrum in which data points are plotted by wave numbers at equal intervals. The Raman spectrum display processing unit performs processing of displaying an equal interval Raman spectrum as a graph representing a relationship between a wave number and intensity.

A second aspect of the present invention is a data processing method including data conversion processing of converting a Raman spectrum obtained by Raman spectroscopic analysis into an equal interval Raman spectrum in which data points are plotted by wave numbers at equal intervals.

According to the present invention, the same software can be used when infrared spectroscopic analysis or Raman spectroscopic analysis is switched to and performed.

DETAILED DESCRIPTION OF THE PREFERRED EMBODIMENTS

1. Schematic Configuration of Infrared Raman Microscope

Figure 1:
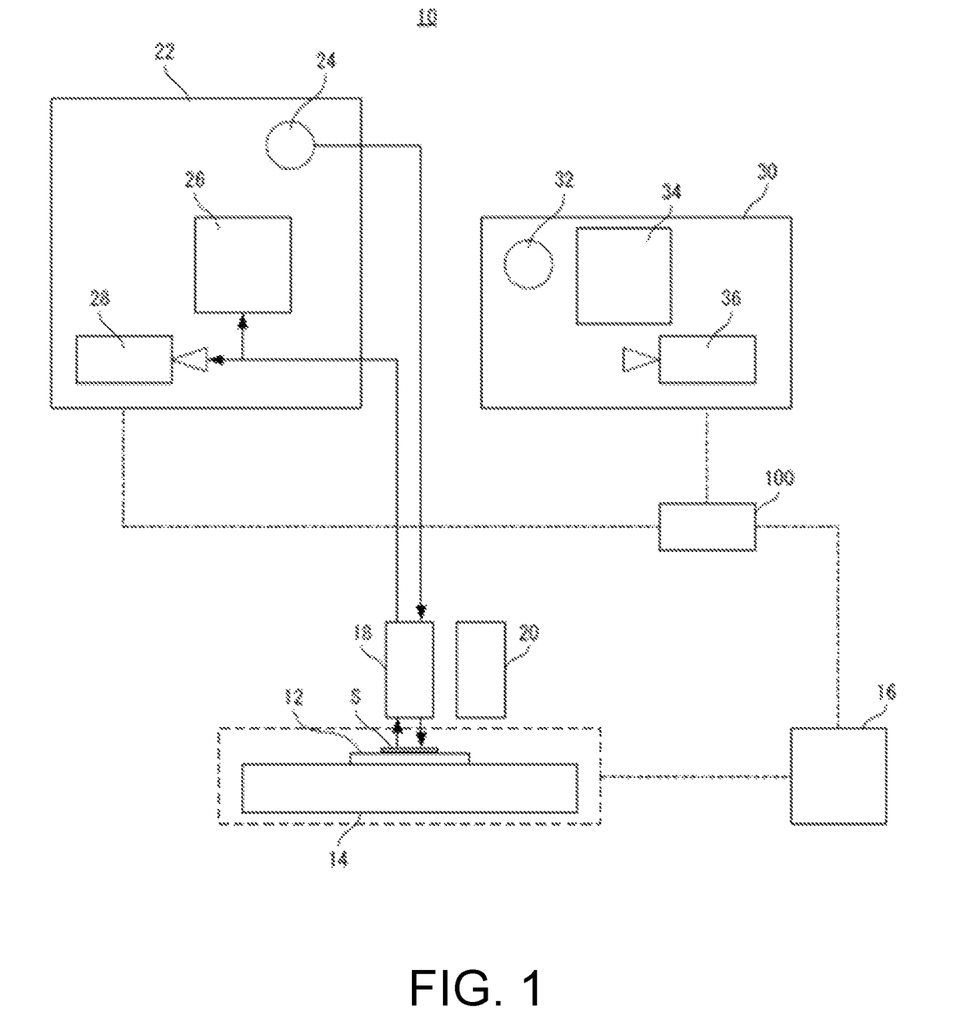
FIG. 1 is a schematic view illustrating an example of a configuration example of an infrared Raman microscope.
Figure 2:
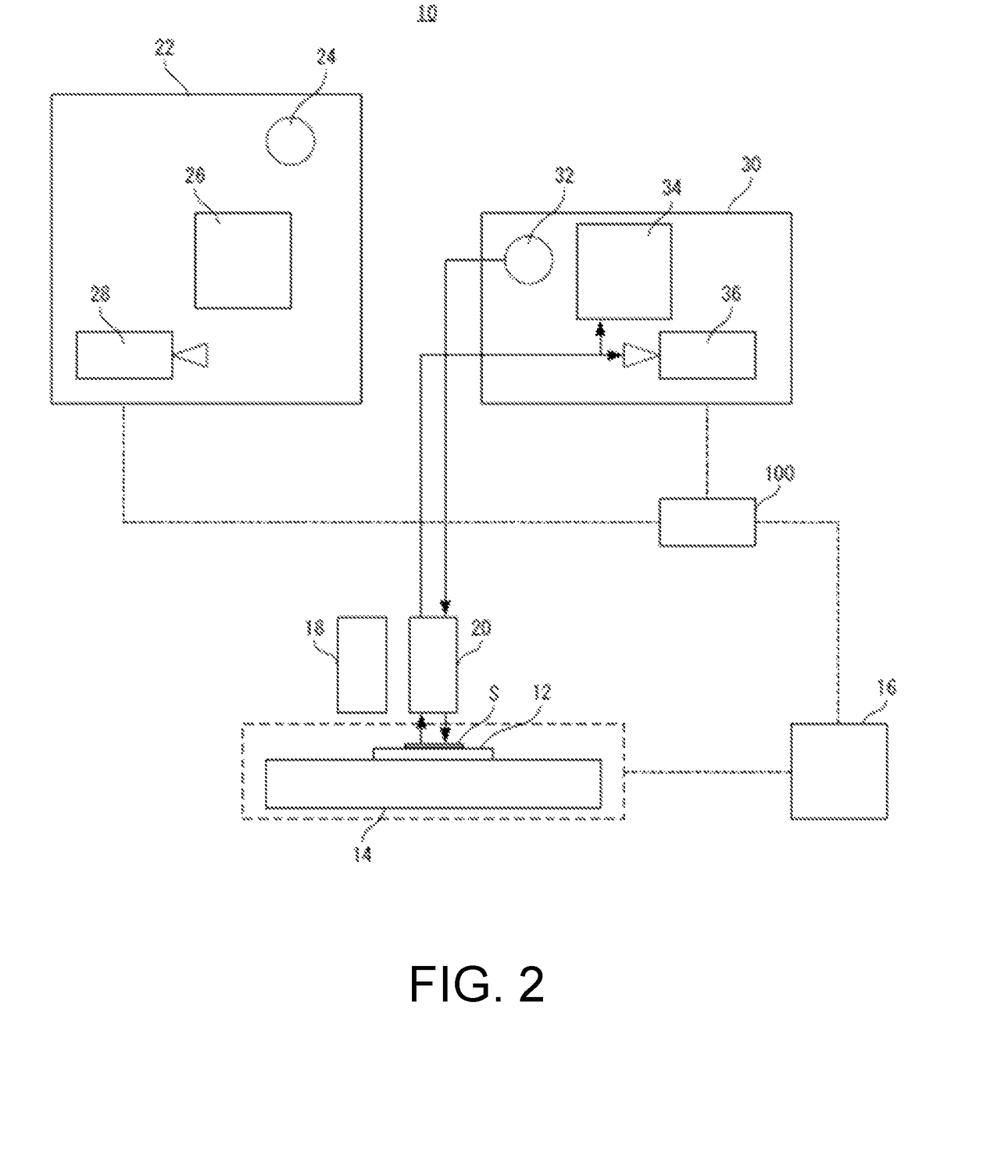
FIG. 2 is a schematic view illustrating an example of a configuration example of the infrared Raman microscope.

FIGS. 1 and 2 are schematic diagrams illustrating an example of a configuration example of an infrared Raman microscope 10. The infrared Raman microscope 10 according to the present embodiment is a microscope that can switch to and perform the infrared spectroscopic analysis and the Raman spectroscopic analysis on a sample S on a stage 14.

Further, FIG. 1 illustrates a state (Raman analysis state) of the infrared Raman microscope 10 when the Raman spectroscopic analysis is performed, and FIG. 2 illustrates a state (infrared analysis state) of the infrared Raman microscope 10 when the infrared spectroscopic analysis is performed.

The infrared Raman microscope 10 includes a plate 12, the stage 14, a drive unit 16, an objective optical element 18, an objective optical element 20, a Raman light detection system 22, an infrared light detection system 30, and the like. The sample S is placed on the stage 14 in a state of being fixed to the plate 12.

The stage 14 can be displaced in the horizontal direction or the vertical direction by driving of the drive unit 16. The drive unit 16 can be electrically controlled, and the drive unit 16 and the stage 14 are mechanically connected. The drive unit 16 includes, for example, a motor, a gear, and the like.

The objective optical element 18 is used for the Raman spectroscopic analysis, and has a configuration in which, for example, a convex lens and a concave lens are combined. When the Raman spectroscopic analysis is performed, as illustrated in FIG. 1, the objective optical element 18 faces the sample S on the plate 12. That is, the objective optical element 18 is located immediately above the sample S on the plate 12.

The objective optical element 20 is used for the infrared spectroscopic analysis, and is, for example, a Cassegrain mirror obtained by combining a concave mirror and a convex mirror. When the infrared spectroscopic analysis is performed, as illustrated in FIG. 2, the objective optical element 20 faces the sample S on the plate 12. That is, the objective optical element 20 is located immediately above the sample S on the plate 12.

The Raman light detection system 22 is used for performing the Raman spectroscopic analysis, and includes a light source 24, a Raman spectrometer 26, and an optical photographing element 28. Light emitted from the light source 24 is, for example, laser light having a wavelength in a visible range or a near-infrared range, and a wavelength of the laser light is about several µm to several tens µm. As illustrated in FIG. 1, when the Raman spectroscopic analysis is performed, light emitted from the light source 24 is guided to the objective optical element 18 by various optical elements (not illustrated).

Light incident on the objective optical element 18 is focused on the sample S fixed to the plate 12. That is, light from the light source 24 is condensed by being transmitted through the objective optical element 18, and is applied to a focal position on the sample S or in the sample S. Raman scattered light is generated from the sample S irradiated with light from the light source 24, and this light is guided to the Raman light detection system 22 by various optical elements (not illustrated). A part of light guided from the objective optical element 18 to the Raman light detection system 22 enters the optical photographing element 28, and the remaining light enters the Raman spectrometer 26.

The Raman spectrometer 26 detects intensity for each wavelength by dispersing the Raman scattered light from the sample S. Based on a detection signal from the Raman spectrometer 26, a Raman spectrum can be acquired. In the Raman spectrum, the vertical axis represents intensity, and the horizontal axis represents a wave number (Raman shift which is a wave number difference between incident light and scattered light). As described above, in the infrared Raman microscope 10, a Raman spectrum can be acquired as the detector (Raman spectrometer 26) receives Raman scattered light from the sample S.

The optical photographing element 28 photographs a visible image of a surface of the sample S in which Raman scattered light is generated. The optical photographing element 28 includes, for example, a charge coupled device (CCD) image sensor, a complementary metal oxide semiconductor (CMOS) image sensor, or the like, and is configured to be able to photograph a still image or a moving image of the sample S. The optical photographing element 28 can photograph all or at least one of a bright field image, a dark field image, a phase difference image, a fluorescence image, a polarization microscope image, and the like of the sample S.

The infrared light detection system 30 is used for performing the infrared spectroscopic analysis, and includes a light source 32, an infrared spectrometer 34, and an optical photographing element 36. Light emitted from the light source 32 is, for example, infrared light emitted from a ceramic heater, and has a wavelength of about 405 nm to 1064 nm, and in many cases, light obtained by combining wavelengths of 532 nm and 785 nm is used. As illustrated in FIG. 2, when the infrared spectroscopic analysis is performed, light emitted from the light source 32 is guided to the objective optical element 20 by various optical elements (not illustrated).

Light incident on the objective optical element 20 is focused on the sample S fixed to the plate 12. That is, light from the light source 32 is condensed by being transmitted through the objective optical element 20, and is applied to a focal position on the sample S or in the sample S. Reflected light from the sample irradiated with light from the light source 32 is guided to the infrared light detection system 30 by various optical elements (not illustrated). A part of the light guided from the objective optical element 20 to the infrared light detection system 30 enters the optical photographing element 36, and the remaining light enters the infrared spectrometer 34.

The infrared spectrometer 34 is, for example, a Fourier transform infrared spectrometer. A spectroscope included in the infrared spectrometer 34 may be a Michelson interference spectroscope. The infrared spectrometer 34 detects intensity for each wavelength by dispersing reflected light of infrared light from the sample. An infrared spectrum can be acquired on the basis of a detection signal from the infrared spectrometer 34. In an infrared spectrum, the vertical axis represents intensity, and the horizontal axis represents a wavelength. As described above, in the infrared Raman microscope 10, an infrared spectrum can be acquired as the detector (infrared spectrometer 34) receives reflected light of infrared light from the sample S.

The optical photographing element 36 photographs a visible image of a surface of the sample S from which infrared light is reflected. The optical photographing element 36 may have a configuration similar to that of the optical photographing element 28. Similarly to the optical photographing element 28, the optical photographing element 36 can photograph a still image or a moving image of the sample S, and can photograph all or at least one of a bright field image, a dark field image, a phase difference image, a fluorescence image, a polarization microscope image, and the like of the sample S.

As described above, in the infrared Raman microscope 10 according to the present embodiment, switching between the infrared spectroscopic analysis and the Raman spectroscopic analysis is enabled, and in a case where switching is made from the infrared spectroscopic analysis to the Raman spectroscopic analysis, a positional relationship between the objective optical element 18 and the plate 12 is adjusted, so that a focal position of light condensed by the objective optical element 18 is adjusted to a predetermined measurement position of a sample. On the other hand, in a case where switching is made from the Raman spectroscopic analysis to the infrared spectroscopic analysis, a positional relationship between the objective optical element 20 and the plate 12 is adjusted, so that a focal position of light condensed by the objective optical element 20 is adjusted to a predetermined measurement position of a sample.

2. Electrical Configuration of Infrared Raman Microscope

Figure 3:
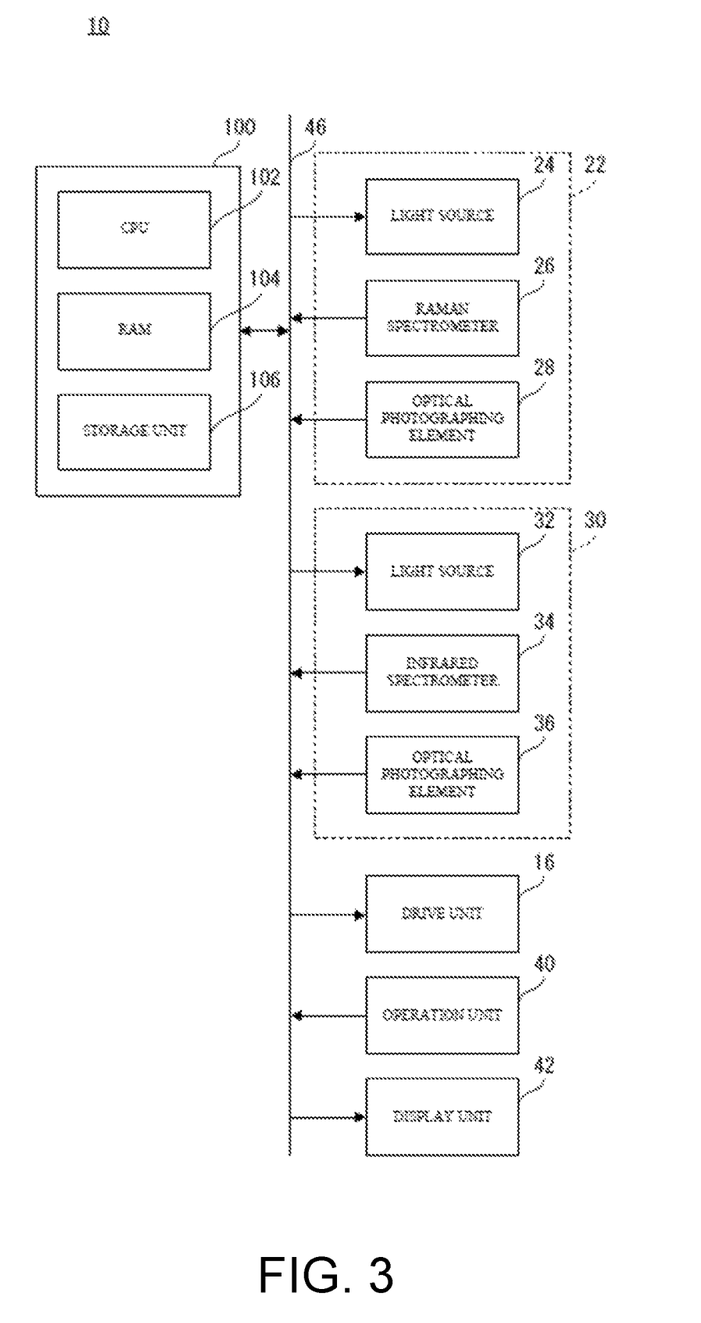
FIG. 3 is a block diagram illustrating an example of an electrical configuration of the infrared Raman microscope.

FIG. 3 is a block diagram illustrating an example of an electrical configuration of the infrared Raman microscope 10. The infrared Raman microscope 10 includes an operation unit 40, a display unit 42, a control unit 100, and the like in addition to the drive unit 16, the Raman light detection system 22, the infrared light detection system 30, and the like.

Further, each of the control unit 100, the drive unit 16, the light source 24, the Raman spectrometer 26, the optical photographing element 28, the light source 32, the infrared spectrometer 34, the optical photographing element 36, the operation unit 40, and the display unit 42 is electrically connected to each other via a circuit 46 such as a bus.

The control unit 100 is responsible for overall control of the infrared Raman microscope 10. The control unit 100 includes a central processing unit (CPU) 102. Further, the control unit 100 includes a random access memory (RAM) 104 and a storage unit 106 that can be directly accessed by the CPU 102.

The RAM 104 is used as a work area and a buffer area of the CPU 102. The storage unit 106 is a non-volatile memory, and for example, a hard disc drive (HDD), a solid state drive (SSD), or the like is used as the storage unit 106.

The storage unit 106 stores a control program for controlling the infrared Raman microscope 10, data (execution data) required for executing the control program, and the like. Note that the storage unit 106 may be configured to include the RAM 104.

The operation unit 40 includes a hardware key (operation key). Further, the operation unit 40 may include an input device. Examples of the input device include a keyboard and a mouse. Furthermore, the input device may include a touch panel. Note that, in this case, the touch panel is provided on a display screen of the display unit 42. Further, the touch panel and the display unit 42 may be integrally formed. Note that the display unit 42 is a general-purpose display.

3. Designation of Measurement Position

A measurement position when the infrared spectroscopic analysis or the Raman spectroscopic analysis is performed can be designated on a visible image of the sample S displayed on the display unit 42. The measurement position is an optional position selected in a horizontal plane. In the present embodiment, it is possible to select and execute point measurement in which an optional measurement position is designated one by one on a visible image of the sample S and measurement of each point is performed, or map measurement in which a range is designated on a visible image of the sample S and measurement of each point (each measurement position) within the range is performed. On a display screen of the display unit 42, a visible image of the sample S is displayed in real time on the basis of a signal from the optical photographing element 28 or the optical photographing element 36. However, a visible image of the sample S displayed on the display unit 42 may be a still image acquired at a predetermined timing.

Further, in the present embodiment, map information is stored in the storage unit 106 in a data format in advance. The map information is information indicating coordinates, specifically, two-dimensional coordinates, on the stage 14. A visible image 50 of the sample S displayed on the display unit 42 is displayed in association with coordinates on the stage 14. Therefore, in a case where a measurement position is designated on a visible image of the sample S displayed on the display unit 42, a point on coordinates corresponding to the measurement position is designated. In the infrared spectroscopic analysis or the Raman spectroscopic analysis, measurement is performed after an optical axis position of light from the light source 24 or the light source 32 is matched with a designated point (measurement position) on coordinates.

In a case where map measurement is performed, an optional range on a visible image of the sample S displayed on the display unit 42 is designated, so that one point in each measurement area when the range is divided into a plurality of grid-like measurement areas is designated as a measurement position. One point (for example, a center point) in each measurement area is a measurement position, and, as an optional range is designated, each measurement position located at equal intervals within the range can be designated.

4. Comparison Display

Figure 4:
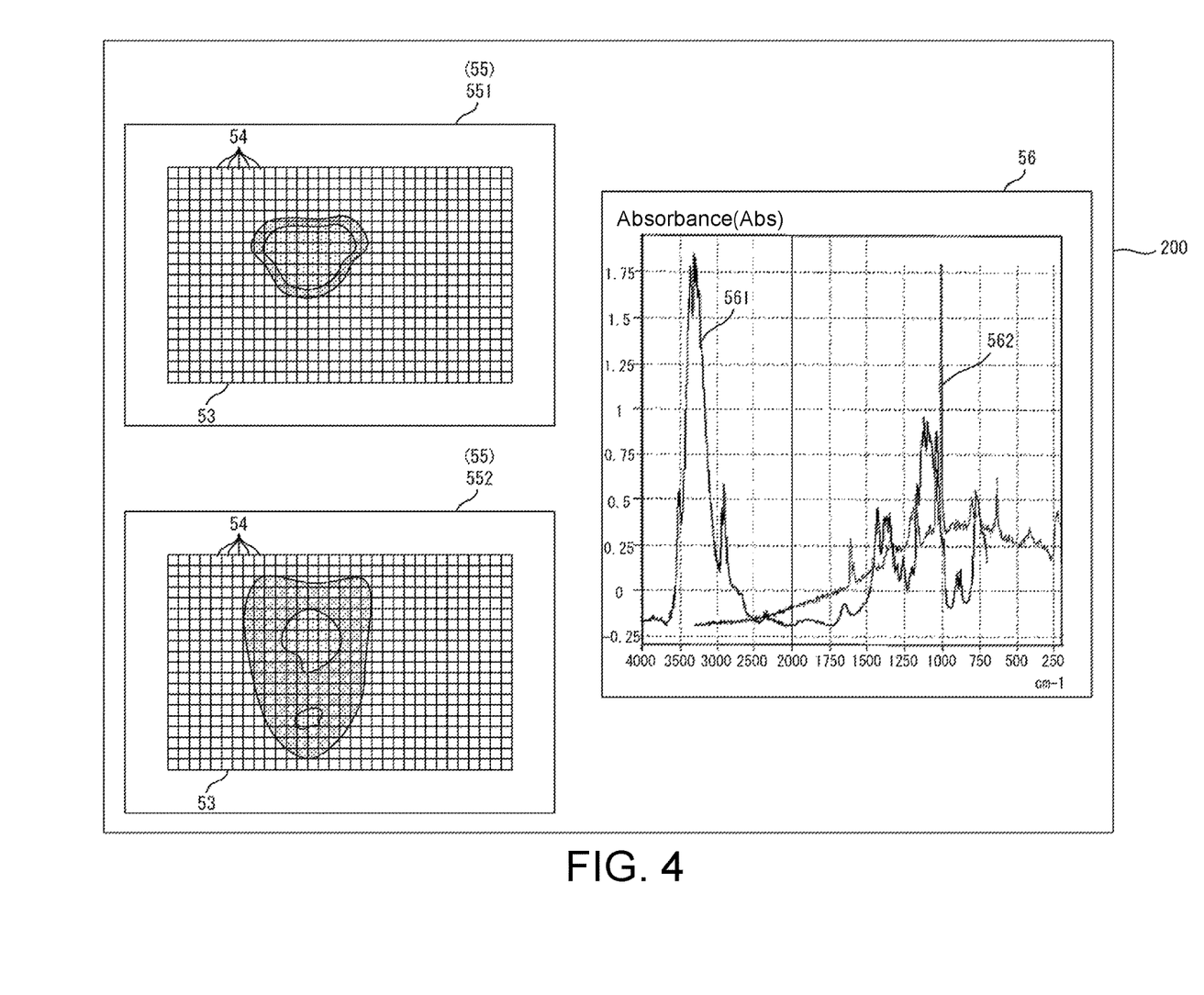
FIG. 4 is a diagram illustrating an example of a comparison display screen in a case where map measurement is performed.

FIG. 4 is a diagram illustrating an example of a comparison display screen 200 in a case where map measurement is performed. In a case where a range 53 of coordinates on the stage 14 is designated in map measurement, the infrared spectroscopic analysis and the Raman spectroscopic analysis are performed for a plurality of measurement positions within the range 53. In this manner, an infrared spectrum and a Raman spectrum associated with each measurement position can be acquired. Further, the acquired infrared spectrum and Raman spectrum at each measurement position can be analyzed, and a result of the analysis can be displayed in a map display area 55 of the display unit 42.

The above analysis is analysis of a characteristic of a spectrum (infrared spectrum and Raman spectrum) at each measurement position, and for example, a calculation result of a peak height of a peak included in a spectrum at each measurement position, a calculation result of a peak area, a result of multivariate analysis, or the like is obtained as an analysis result of a spectrum at each measurement position. The obtained analysis result at each measurement position is represented in a mode in which a difference in analysis results can be visually identified by color, density, or the like in each measurement area 54 of the range 53 designated on a visible image. As a result, a plurality of the measurement areas 54 arranged in a grid-like manner are represented by different colors, densities, or the like, so that distribution of analysis results at each measurement position is mapped and displayed.

The comparison display screen 200 illustrated in FIG. 4 is a screen for comparing and checking a result of the infrared spectroscopic analysis and a result of the Raman spectroscopic analysis, and is an example of an operation screen on which an operator can perform input operation. The comparison display screen 200 includes an infrared map display area 551, a Raman map display area 552, and a graph display area 56.

In the infrared map display area 551, an analysis result of an infrared spectrum at each measurement position is mapped and displayed within the range 53 of predetermined coordinates on the stage 14. The range 53 of coordinates mapped and displayed can be adjusted by an operator operating the operation unit 40. Therefore, an operator can adjust the range 53 of desired coordinates to be displayed in the infrared map display area 551, and can check distribution of an analysis result at each measurement position within the range 53.

In the Raman map display area 552, an analysis result of a Raman spectrum at each measurement position is mapped and displayed within the range 53 of predetermined coordinates on the stage 14. The range 53 of coordinates mapped and displayed can be adjusted by an operator operating the operation unit 40. Therefore, an operator can adjust the range 53 of desired coordinates to be displayed in the Raman map display area 552, and can check distribution of an analysis result at each measurement position within the range 53.

In the infrared map display area 551 and the Raman map display area 552, the range 53 of coordinates mapped and displayed may be the same or different. Further, in the infrared map display area 551 and the Raman map display area 552, scale of coordinates mapped and displayed may be the same or different. An operator may be able to individually adjust scale of coordinates of the infrared map display area 551 and the Raman map display area 552 by operating the operation unit 40.

In the graph display area 56, an infrared spectrum 561 and a Raman spectrum 562 are graphically displayed. An operator can designate a measurement position corresponding to the measurement area 54 by selecting an optional one of the measurement area 54 in each of the infrared map display area 551 and the Raman map display area 552. In a case where an optional measurement position is designated in the infrared map display area 551 and the Raman map display area 552, the infrared spectrum 561 and the Raman spectrum 562 associated with the designated measurement position are graphically displayed in the same graph display area 56. Note that, in the graph display area 56, the infrared spectrum 561 and the Raman spectrum 562 are displayed in an overlapping manner with the horizontal axis representing a wave number and the vertical axis representing intensity.

5. Data Conversion Processing for Raman Spectrum

In the present embodiment, data conversion processing is performed for a Raman spectrum obtained by the Raman spectroscopic analysis, and then the Raman spectrum 562 after the data conversion processing is displayed in the graph display area 56. Hereinafter, a specific example of the data conversion processing will be described.

Figure 5:
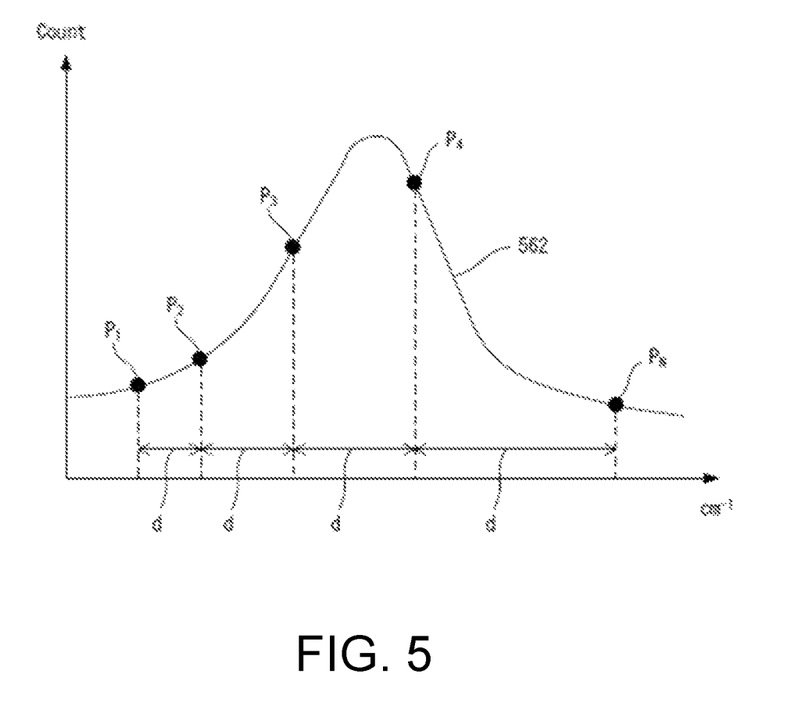
FIG. 5 is a schematic view illustrating an example of a Raman spectrum before data conversion processing.

FIG. 5 is a schematic diagram illustrating an example of the Raman spectrum 562 before the data conversion processing. When the Raman spectrum 562 is acquired based on a detection signal from the Raman spectrometer 26, data representing a relationship between a wavelength and intensity obtained in the Raman spectrometer 26 is converted into data representing a relationship between a wave number and intensity.

Specifically, a wavelength is converted into a wave number by Equation (1) below. Note that, in Equation (1), v is a wave number (cm$^{-1}$), $\lambda_L$ is a wavelength (nm) of incident light on the sample S, and $\lambda$ is a wavelength (nm) of scattered light received by the Raman spectrometer 26. The wave number v represented by Equation (1) is a wave number difference (Raman shift) between incident light and scattered light.

$$v=(1/\lambda_L-1/\lambda)\times 10^7 \quad (1)$$

As described above, when the Raman spectrum 562 is acquired based on a detection signal from the Raman spectrometer 26, since a wavelength is converted into a wave number, as illustrated in FIG. 5, in the acquired Raman spectrum 562, intervals (data intervals d) between data points $P_1$ to $P_N$ plotted in the horizontal axis direction are not equal.

On the other hand, when the infrared spectrum 561 is acquired based on a detection signal from the infrared spectrometer 34, Fourier transform is performed for received light intensity of each wavelength, so that the infrared spectrum 561 representing a relationship between a wave number and intensity is obtained. That is, processing of converting a wavelength into a wave number as for the Raman spectrum 562 is not performed. For this reason, in the infrared spectrum 561, intervals between data points plotted in the horizontal axis direction are equal.

In the present embodiment, the data conversion processing is performed on the Raman spectrum 562 in which data intervals d are not equal as illustrated in FIG. 5, so that the Raman spectrum 562 is converted into a Raman spectrum (equal interval Raman spectrum) in which data points $Q_1$ to $Q_N$ (see FIG. 6C) are plotted by wave numbers at equal intervals.

Figure 6A:
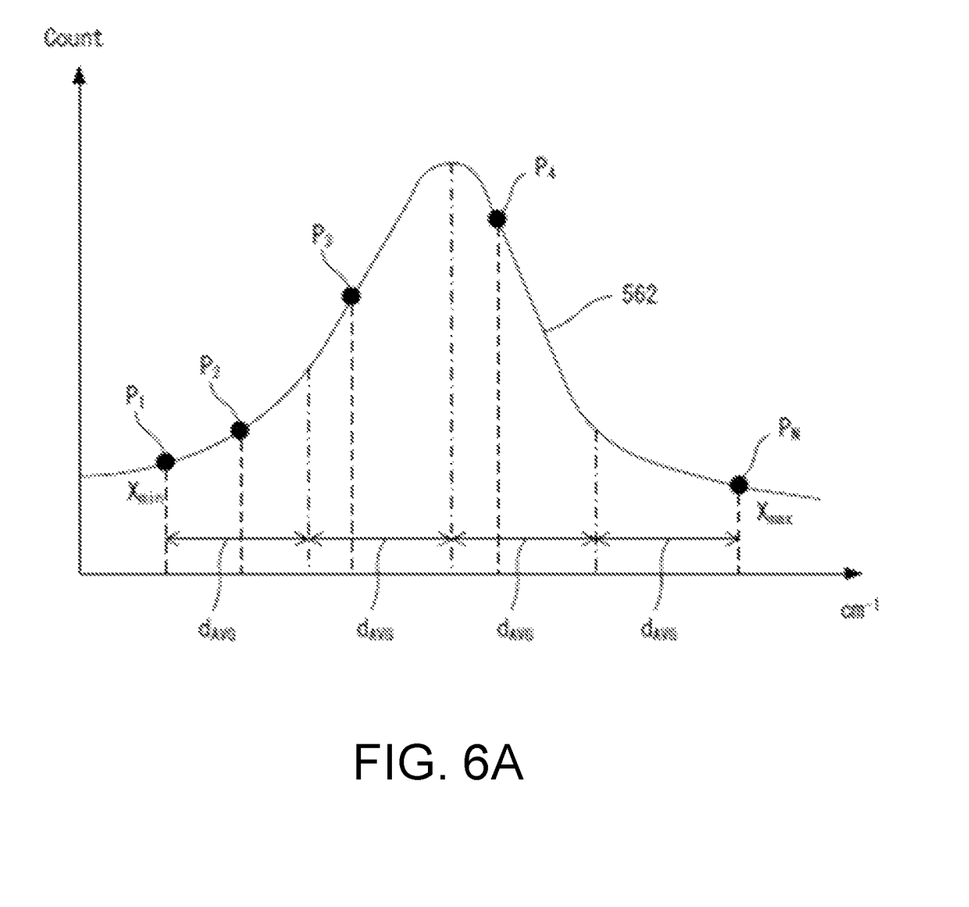
FIG. 6A is a schematic view for explaining the data conversion processing for a Raman spectrum.
Figure 6B:
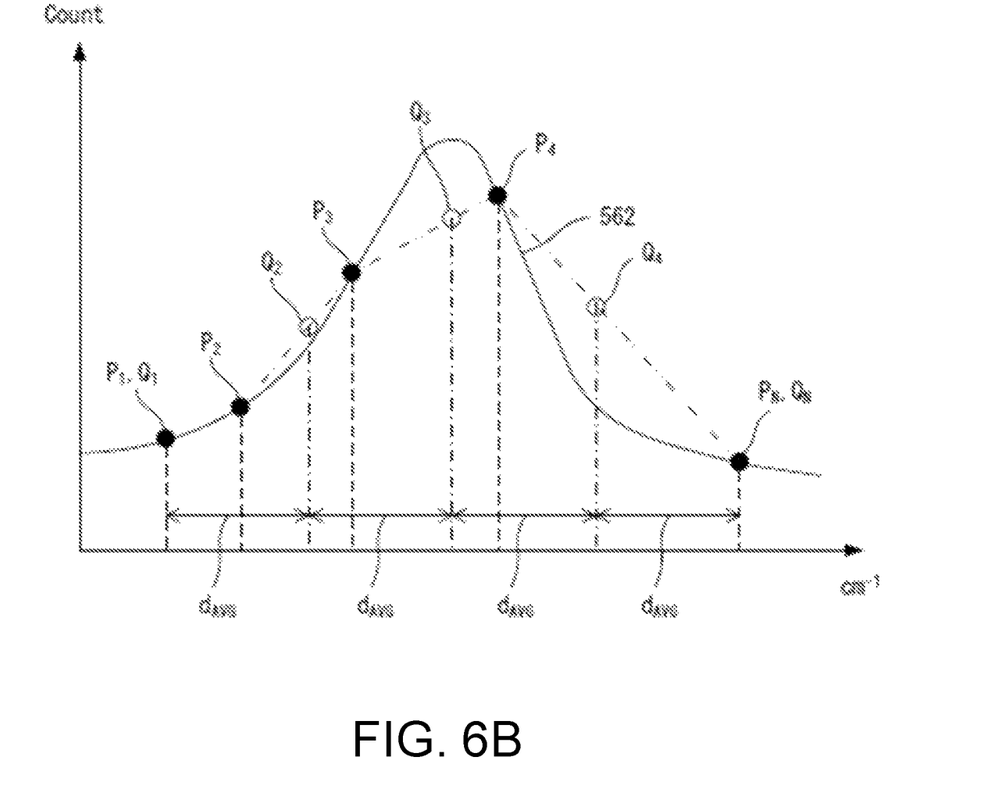
FIG. 6B is a schematic view for explaining the data conversion processing for a Raman spectrum.
Figure 6C:
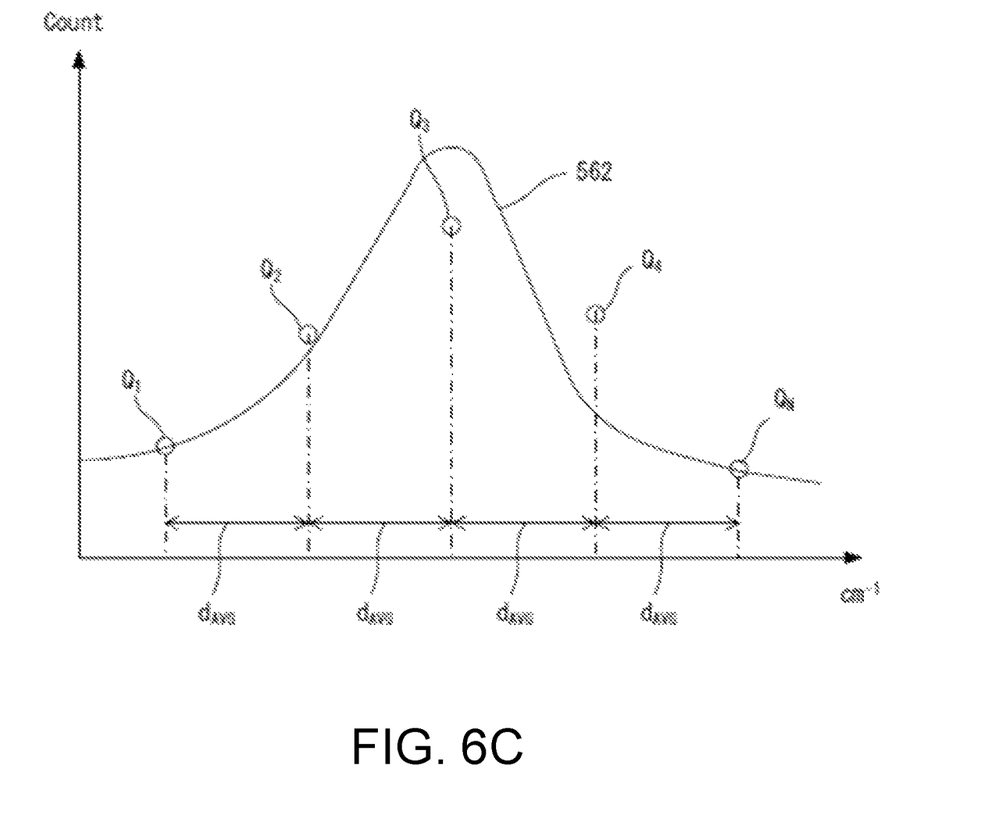
FIG. 6C is a schematic view for explaining the data conversion processing for a Raman spectrum.

FIGS. 6A to 6C are schematic diagrams for explaining data conversion processing on the Raman spectrum 562. In the data conversion processing, first, as illustrated in FIG. 6A, processing of rearranging positions of the data points $P_1$ to $P_N$ in the horizontal axis direction at equal intervals is performed.

Specifically, the data interval $d_{AVG}$ in a case where the data points $P_1$ to $P_N$ are rearranged at equal intervals in the horizontal axis direction is calculated by Equation (2) below. In Equation (2) below, $d_{AVG}$ is an average value of the data intervals d, $X_{max}$ is a maximum value on the horizontal axis of the data points $P_1$ to $P_N$, $X_{min}$ is a minimum value on the horizontal axis of the data points $P_1$ to $P_N$, and N is the number of the data points $P_1$ to $P_N$.

$$d_{AVG}=(X_{max}-X_{min})(N-1) \quad (2)$$

Next, as illustrated in FIG. 6B, positions of the data points $Q_2$ to $Q_{N-1}$ in a case where the data points $P_1$ to $P_N$ are rearranged at equal intervals in the horizontal axis direction are calculated using Equations (3) to (6) below. However, a position of the data point $Q_1$ coincides with a position of the data point $P_1$ before the data conversion processing, and a position of the data point $Q_N$ coincides with a position of the data point $P_N$ before the data conversion processing. Therefore, in Equations (3) to (6), n is a value of 2 to N−1. Note that, in Equations (3) to (6) below, $X_n$ is a value on the horizontal axis of the data point $Q_n$, $Y_n$ is a value on the vertical axis of the data point $Q_n$, $x_n$ is a value on the horizontal axis of the data point $P_n$, and $y_n$ is a value on the vertical axis of the data point $P_n$.

$$X_n=X_{n-1}+d_{AVG} \quad (3)$$

$$Y_n=a_n X_n+b_n \quad (4)$$

$$a_n=(y_{n+1}-y_n)/(x_{n+1}-x_n) \quad (5)$$

$$b_n=(y_{n+1}-y_n)-a_n(x_{n+1}-x_n) \quad (6)$$

Linear interpolation is performed between data points adjacent in the horizontal axis direction by operations of Equations (3) to (6) above. That is, the data conversion processing in the present embodiment includes processing of performing linear interpolation between a plurality of the data points $P_1$ to $P_N$ of a Raman spectrum obtained by the Raman spectroscopic analysis.

As illustrated in FIG. 6C, the Raman spectrum 562 after the linear interpolation is performed between a plurality of the data points $P_1$ to $P_N$ is an equal interval Raman spectrum in which the data points $Q_1$ to $Q_N$ are plotted by wave numbers at equal intervals. Note that, in FIG. 6C, each of the data points $Q_1$ to $Q_N$ after the data conversion processing is greatly deviated from each of the data points $P_1$ to $P_N$ before the data conversion processing. However, this is because intervals between the data points $P_1$ to $P_N$ are represented to be large for easy understanding of the description, and an actual deviation amount is very small.

Figure 7:
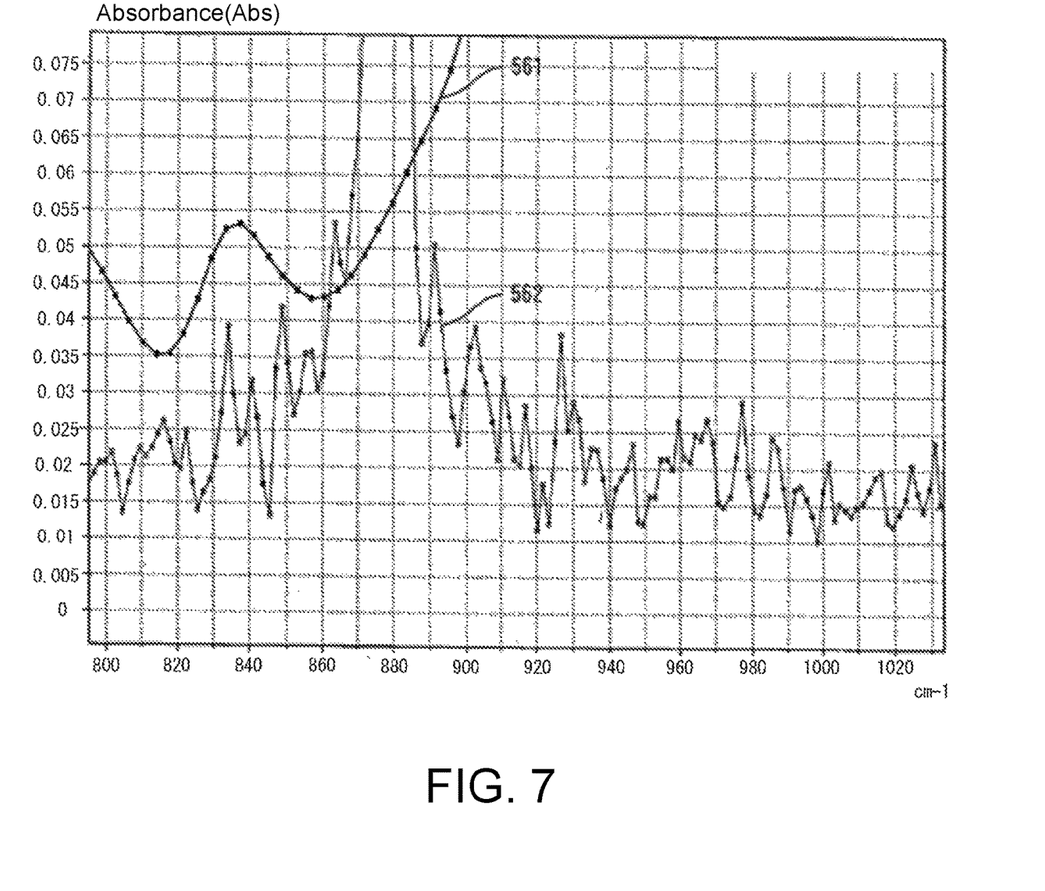
FIG. 7 is a diagram illustrating an example in which a Raman spectrum after the data conversion processing is displayed in a manner overlapping an infrared spectrum.

FIG. 7 is a diagram illustrating an example in which the Raman spectrum 562 after the data conversion processing is displayed in a manner overlapping the infrared spectrum 561. As illustrated in FIG. 7, in the Raman spectrum (equal distance Raman spectrum) 562 after the data conversion processing, intervals between data points plotted in the horizontal axis direction are equal, similarly to the infrared spectrum 561.

Note that an interval between data points in the horizontal axis direction in the infrared spectrum 561 and an interval between data points in the horizontal axis direction in the Raman spectrum 562 after the data conversion processing may be or may not be the same.

6. Specific Example of Electrical Configuration

Figure 8:
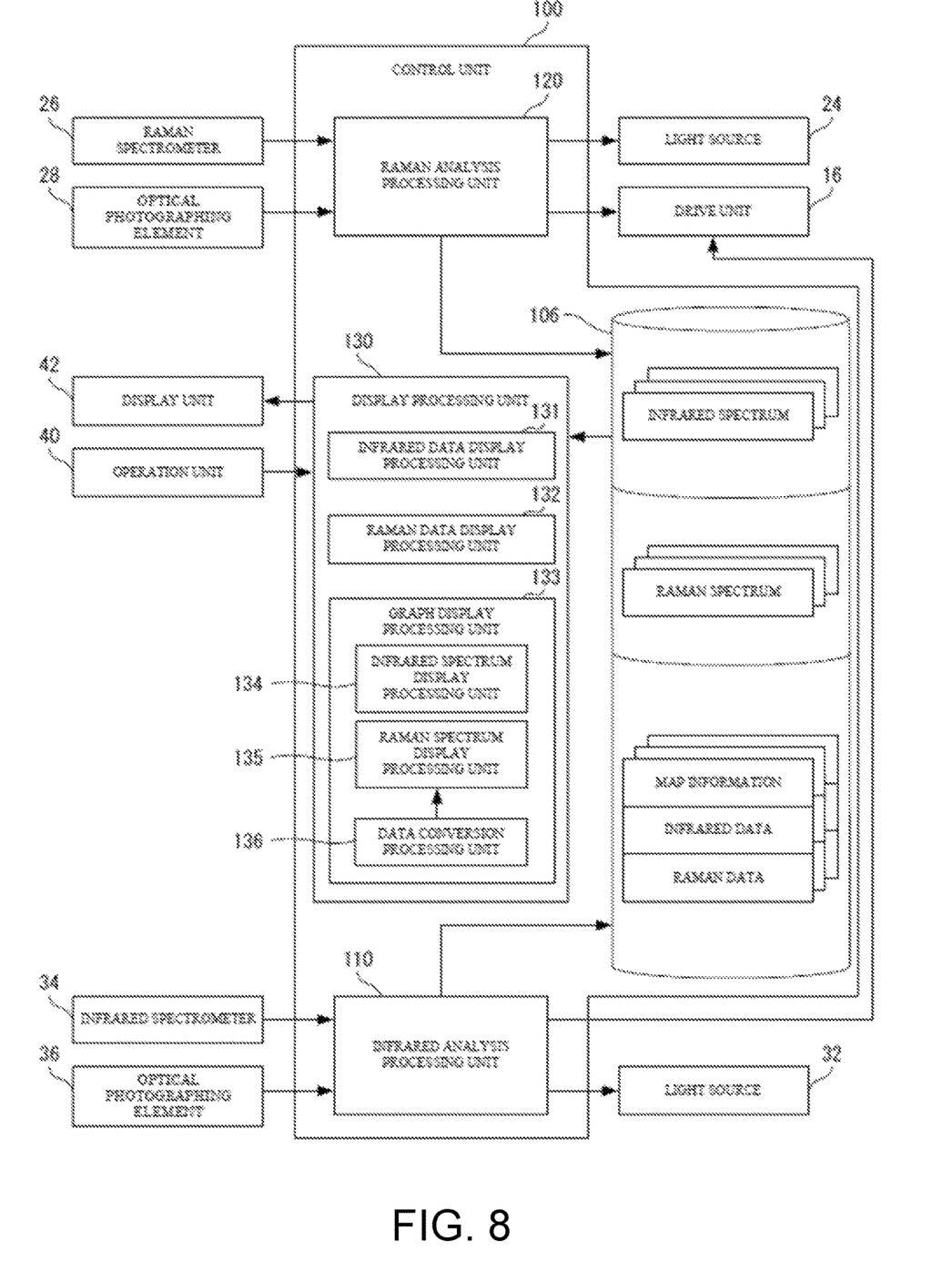
FIG. 8 is a functional block diagram illustrating a specific example of an electrical configuration of the infrared Raman microscope.

FIG. 8 is a functional block diagram illustrating a specific example of an electrical configuration of the infrared Raman microscope 10. The control unit 100 functions as an infrared analysis processing unit 110, a Raman analysis processing unit 120, a display processing unit 130, and the like when the CPU 102 (see FIG. 3) executes a program.

The infrared analysis processing unit 110 executes processing for performing the infrared spectroscopic analysis on the sample on the stage 14. That is, a sample is irradiated with infrared light collected from the light source 32, and an infrared spectrum is acquired based on a detection signal from the infrared spectrometer 34. Further, the infrared analysis processing unit 110 can acquire a surface image of a sample during the infrared spectroscopic analysis on the basis of a visible image photographed by the optical photographing element 36. At the time of the infrared spectroscopic analysis, analysis may be performed while the stage 14 is moved by control of the drive unit 16.

The Raman analysis processing unit 120 executes processing for performing the Raman spectroscopic analysis on a sample on the stage 14. That is, a sample is irradiated with laser light collected from the light source 24, and a Raman spectrum is acquired based on a detection signal from the Raman spectrometer 26. Further, the Raman analysis processing unit 120 can acquire a surface image of a sample during the Raman spectroscopic analysis on the basis of a visible image photographed by the optical photographing element 28. At the time of the Raman spectroscopic analysis, analysis may be performed while the stage 14 is moved by control of the drive unit 16.

Data during the infrared spectroscopic analysis obtained by processing of the infrared analysis processing unit 110 and data during the Raman spectroscopic analysis obtained by processing of the Raman analysis processing unit 120 are stored in the storage unit 106. The storage unit 106 stores, for example, a Raman spectrum acquired by the Raman spectroscopic analysis and an infrared spectrum acquired by the infrared spectroscopic analysis. Further, the storage unit 106 stores an analysis result (infrared data) of an infrared spectrum at each measurement position 52 and an analysis result (Raman data) of a Raman spectrum at each of the measurement positions 52 in association with coordinates (map information) on the stage 14.

The display processing unit 130 controls display on the display unit 42. That is, under control of the display processing unit 130, various screens such as an operation screen are displayed on a display screen of the display unit 42. When an operation screen is displayed on the display unit 42, input operation on the operation screen can be performed by operation of the operation unit 40. When input operation is performed using the operation unit 40, input information (numerical value or the like) is reflected and displayed on an operation screen of the display unit 42.

The display processing unit 130 includes an infrared data display processing unit 131, a Raman data display processing unit 132, and a graph display processing unit 133. Further, the graph display processing unit 133 includes an infrared spectrum display processing unit 134, a Raman spectrum display processing unit 135, and a data conversion processing unit 136.

In a case where map measurement is performed, the infrared data display processing unit 131 causes an analysis result of an infrared spectrum at each measurement position to be mapped and displayed as infrared data in the infrared map display area 551 in association with a point of coordinates of each measurement position. Further, the Raman data display processing unit 132 causes an analysis result of a Raman spectrum at each measurement position to be mapped and displayed as Raman data in the Raman map display area 552 in association with a point of coordinates of each measurement position.

In a case where an optional measurement position (measurement area 54) is designated in the infrared map display area 551 and the Raman map display area 552, the graph display processing unit 133 graphically displays the infrared spectrum 561 and the Raman spectrum 562 associated with the designated measurement position in the same graph display area 56. Specifically, the infrared spectrum display processing unit 134 graphically displays the infrared spectrum 561 in the graph display area 56, and the Raman spectrum display processing unit 135 graphically displays the Raman spectrum 562 in the graph display area 56. At this time, scale of an intensity value of at least one of the infrared spectrum 561 and the Raman spectrum 562 graphically displayed in the graph display area 56 may be adjusted so that peak heights of the spectra 561 and 562 coincide with each other.

In the present embodiment, the data conversion processing unit 136 performs processing of converting a Raman spectrum obtained by the Raman spectroscopic analysis into a Raman spectrum (equal interval Raman spectrum) in which data points are plotted by wave numbers at equal intervals (see FIGS. 6A to 6C). Then, the Raman spectrum display processing unit 135 performs processing of displaying a Raman spectrum (equal interval Raman spectrum) after the data conversion processing in the graph display area 56 as a graph representing a relationship between a wave number and intensity.

On the other hand, the data conversion processing is not performed on an infrared spectrum, and the infrared spectrum display processing unit 134 performs processing of displaying an infrared spectrum obtained by the infrared spectroscopic analysis in the graph display area 56 as a graph representing a relationship between a wave number and intensity.

5. Aspect

It is understood by those skilled in the art that a plurality of the exemplary embodiments described above are specific examples of an aspect below.

(Item 1) An infrared Raman microscope according to an aspect is an infrared Raman microscope capable of switching to and performing infrared spectroscopic analysis or Raman spectroscopic analysis on a sample on a stage. The infrared Raman microscope may include:

an infrared spectrum display processing unit that performs processing of displaying an infrared spectrum obtained by infrared spectroscopic analysis in a graph representing a relationship between a wave number and intensity;

a data conversion processing unit that performs processing of converting a Raman spectrum obtained by Raman spectroscopic analysis into an equal interval Raman spectrum in which data points are plotted by wave numbers at equal intervals; and a Raman spectrum display processing unit that performs processing of displaying the equal interval Raman spectrum as a graph representing a relationship between a wave number and intensity.

According to the infrared Raman microscope described in Item 1, since a Raman spectrum obtained by the Raman spectroscopic analysis is converted into a spectrum in which data points are plotted by wave numbers at equal intervals similarly to the infrared spectrum, the same software can be used when the infrared spectroscopic analysis or the Raman spectroscopic analysis is switched to and performed.

(Item 2) In the infrared Raman microscope according to Item 1, processing by the data conversion processing unit may include processing of performing linear interpolation between a plurality of data points of a Raman spectrum obtained by Raman spectroscopic analysis.

According to the infrared Raman microscope described in Item 2, a Raman spectrum obtained by the Raman spectroscopic analysis can be converted into an equal interval Raman spectrum using linear interpolation in an excellent manner.

(Item 3) A data processing method according to an aspect may include data conversion processing of converting a Raman spectrum obtained by Raman spectroscopic analysis into an equal interval Raman spectrum in which data points are plotted by wave numbers at equal intervals.

According to the data processing method described in Item 3, since a Raman spectrum obtained by the Raman spectroscopic analysis is converted into a spectrum in which data points are plotted by wave numbers at equal intervals similarly to the infrared spectrum, the same software can be used when the infrared spectroscopic analysis or the Raman spectroscopic analysis is switched to and performed.

(Item 4) In the data processing method according to Item 3, the data conversion processing may include processing of performing linear interpolation between a plurality of data points of a Raman spectrum obtained by Raman spectroscopic analysis.

According to the data processing method described in Item 4, a Raman spectrum obtained by the Raman spectroscopic analysis can be converted into an equal interval Raman spectrum using linear interpolation in an excellent manner.

What is claimed is:

1. An infrared Raman microscope capable of switching to and performing infrared spectroscopic analysis or Raman spectroscopic analysis on a sample on a stage, the infrared Raman microscope comprising:

an infrared spectrum display processing unit that performs processing of displaying an infrared spectrum obtained by infrared spectroscopic analysis in a graph representing a relationship between a wave number and intensity, wherein an axis of a direction of the graph represents wave numbers which comprise the wave number, and intervals between the wave numbers are equal;

a data conversion processing unit that performs processing of converting a Raman spectrum obtained by Raman spectroscopic analysis into an equal interval Raman spectrum in which data points are plotted by wave numbers at equal intervals, wherein an axis of the direction of the Raman spectrum represents a Raman shift which is a wave number difference between an incident light and a scattered light, and intervals along the axis of the direction for the Raman spectrum are not equal intervals, and wherein wave numbers of the equal interval Raman spectrum are equal intervals so as to match the wave numbers; and a Raman spectrum display processing unit that performs processing of displaying the equal interval Raman spectrum as a graph representing a relationship between a wave number and intensity.

2. The infrared Raman microscope according to claim 1, wherein processing by the data conversion processing unit includes processing of performing linear interpolation between a plurality of data points of a Raman spectrum obtained by Raman spectroscopic analysis.

3. A data processing method performed by an infrared Raman microscope capable of switching to and performing infrared spectroscopic analysis or Raman spectroscopic analysis on a sample on a stage, the method comprising:

performing an infrared spectrum display process of displaying an infrared spectrum obtained by infrared spectroscopic analysis in a graph representing a relationship between a wave number and intensity, wherein an axis of a direction of the graph represents wave numbers which comprise the wave number, and intervals between the wave numbers are equal;

performing a data conversion process of converting a Raman spectrum obtained by Raman spectroscopic analysis into an equal interval Raman spectrum in which data points are plotted by wave numbers at equal intervals, wherein an axis of the direction of the Raman spectrum represents a Raman shift which is a wave number difference between an incident light and a scattered light, and intervals along the axis of the direction for the Raman spectrum are not equal intervals, and wherein wave numbers of the equal interval Raman spectrum are equal intervals so as to match the wave numbers; and performing a Raman spectrum process of displaying the equal interval Raman spectrum as a graph representing a relationship between a wave number and intensity.

4. The data processing method according to claim 3, wherein the data conversion processing includes processing of performing linear interpolation between a plurality of data points of a Raman spectrum obtained by Raman spectroscopic analysis.

* * * * *